No. 751,680. PATENTED FEB. 9, 1904.
W. T. NORCOTT.
NAIL PULLER.
APPLICATION FILED OCT. 23, 1903.
NO MODEL.
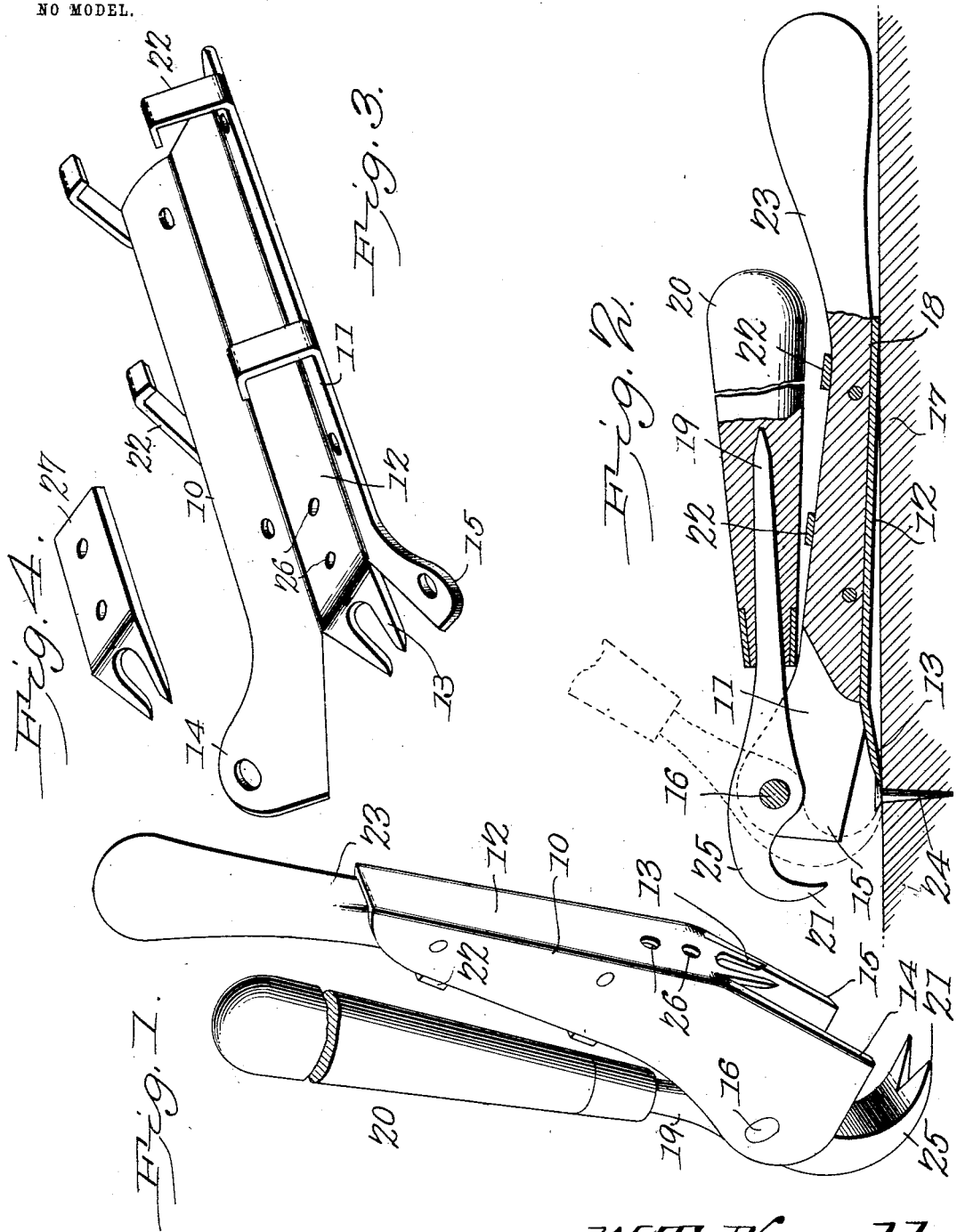
W. T. Norcott,
Inventor.
by C. A. Snow & Co
Attorneys
Witnesses
E. F. Stewart
C. N. Woodward No. 751,680.

Patented February 9, 1904.

UNITED STATES PATENT OFFICE.

WILLIAM T. NORCOTT, OF KEDRON, ARKANSAS.

NAIL-PULLER.

SPECIFICATION forming part of Letters Patent No. 751,680, dated February 9, 1904.

Application filed October 23, 1903. Serial No. 178,268. (No model.)

*To all whom it may concern:*

Be it known that I, WILLIAM T. NORCOTT, a citizen of the United States, residing at Kedron, in the county of Cleveland and State of Arkansas, have invented a new and useful Nail-Puller, of which the following is a specification.

This invention relates to devices for extracting nails from boxes, shipping-cases, and the like, and has for its object to simplify and improve devices of this character and produce an implement which may be more easily operated and with less disfigurement to the wood adjacent to the nail than with similar implements as heretofore constructed.

The invention consists in certain novel features of construction, as hereinafter shown and described, and specified in the claims.

In the drawings illustrative of the invention, in which corresponding parts are denoted by like designating characters, Figure 1 is a perspective view of the implement. Fig. 2 is a side elevation, partially in section, of the implement applied. Fig. 3 is a perspective view of the "blank" from which the "stock" or body portion of the implement is "struck up." Fig. 4 is a perspective view of the supplemental claw provided for attachment in event of breakage.

The improved implement comprises a stock or body portion formed from a single piece of metal, preferably sheet-steel, struck up into the proper shape and comprising spaced side portions 10 11, bottom portion 12, with intermediate claws 13 and extended ears 14 15, connected by a pivot-pin 16. The claws are bent slightly beyond the general outer surface of the bottom portion 12, so that when placed upon a flat surface, as at 17 in Fig. 2, the stock will touch only at its "heel end" at 18, leaving the claw inclined to the plane of the surface 17, the object to be hereinafter described.

Pivoted upon the pin 16 is a jaw member 19 and extended into a handle 20 at one end and terminating in a curved claw 21 at the other end for coaction with the claw 13, as shown in Fig. 2.

The upper edges of the side portions 10 11 are connected by transverse bars 22, and a supplemental handle 23 may be connected within the stock, if required.

When a nail is to be extracted, the stock portion comprised by the parts 10 11 12 is laid upon the structure 18 with claw 13 a short distance from the nail 24 to be extracted and forced toward the nail-head with a downwardly longitudinal pressure either by the foot, hand, or a light blow from a hammer or other implement or by pressure upon the handle 23. The concaved form of the lower surfaces of the parts 10 11 12, it will be noted by reference to Fig. 2, causes the point of the claw 13 only to come in contact with the structure 18. Hence when pressure is applied, as above noted, the claw will "dig" into the wood and embrace the nail beneath the head at one side, as shown. Then by forcing the point of the claw 21 beneath the nail-head from the opposite side by elevating the handle 20 the "grip" upon the nail will be completed, and it may be readily extracted by rolling the implement upon the curved surface 25 in the same manner as a claw-hammer acts. The portion embraced by the members 10 11 12 thus forms a jaw member which is relatively stationary until the nail is ready to be drawn, when it thereafter serves as a means for holding the nail in engagement with the claw member 13 when the handle 20 is operated to extract the nail by rolling the implement upon the part 25.

The implement may be constructed of any required size or strength and of any required metal, but will preferably be of steel and of sufficient strength to withstand the strains to which they will be subjected.

It will be seen that an implement of extreme simplicity, durability, and strength is produced which is easy of application and operation and will not mar or disfigure the wood adjacent to the nails which it is employed to extract, but will draw the nails without bending them, and will therefore require less power to extract them.

The bottom portion 12 will be provided with spaced apertures 26, and each implement will be furnished with a supplemental claw 27, to be attached by rivets through the apertures 26 in event of the breakage of the integral claw 13, and thus prolong the "life" of the implement. If preferred, the implement can be manufactured with the supplemental or attached claw 27 instead of the integral claw 13. In this case the attached claw could be tempered hard enough to withstand the strains more effectually.

Having thus described the invention, what I claim is—

1. In a nail-puller, a stock member formed with a bottom portion having a claw at one end for engagement with one side of the nail to be extracted and integral spaced side portions connected by integral transverse tie-bars and extended into spaced ears, and a movable jaw member pivoted between said ears in advance of said stock-claw and terminating in a claw for coaction therewith at the opposite side of the nail, substantially as described.

2. In a nail-puller, a stock member formed with a bottom portion having a claw at one end for engagement with one side of the nail to be extracted and integral spaced side portions connected by integral transverse tie-bars and extended into spaced ears, a movable jaw member pivoted between said ears in advance of said stock-claw and terminating in a claw for coaction therewith, at the opposite side of the nail, and a handle member connected in in said stock and extending rearwardly thereof, substantially as described.

In testimony that I claim the foregoing as my own I have hereto affixed my signature in the presence of two witnesses.

WILLIAM T. NORCOTT.

Witnesses:
B. F. QUINN,
W. J. MAY.